United States Patent [19]

Trares et al.

[11] Patent Number: 5,524,688

[45] Date of Patent: Jun. 11, 1996

[54] PNEUMATIC TIRE HAVING A HIGH ENDING, TURNUP LOCKED BEAD CONSTRUCTION

[75] Inventors: Keith C. Trares, Akron; Michael A. Kolowski, Mogadore; Jeffrey W. Kahrs, Hartville, all of Ohio

[73] Assignee: The Goodyear Tire & Rubber Company, Akron, Ohio

[21] Appl. No.: 335,621

[22] Filed: Nov. 8, 1994

Related U.S. Application Data

[63] Continuation-in-part of Ser. No. 84,371, Jun. 29, 1993, abandoned.

[51] Int. Cl.$^6$ .................. B60C 15/00; B60C 15/04; B60C 15/06
[52] U.S. Cl. .................. 152/540; 152/539; 152/543; 152/546; 152/552; 152/554
[58] Field of Search .................. 152/539–540, 152/542–544, 546, 552, 554; 245/1.5

[56] References Cited

U.S. PATENT DOCUMENTS

| 4,387,759 | 6/1983 | Obata et al. | 152/554 X |
| 4,390,052 | 6/1983 | Mendiola et al. | 152/554 X |
| 4,930,560 | 6/1990 | Lesti et al. | 152/554 |
| 4,941,523 | 7/1990 | Galante et al. | 152/543 |
| 5,058,649 | 10/1991 | Hoang et al. | 152/540 |
| 5,379,819 | 1/1995 | Adachi | 152/542 |
| 5,415,216 | 5/1995 | Kajiwara et al. | 152/542 X |
| 5,431,209 | 7/1995 | Kajiwara et al. | 152/542 X |

FOREIGN PATENT DOCUMENTS

| 251980 | 1/1988 | European Pat. Off. |
| 434206 | 6/1991 | European Pat. Off. |
| 86479 | 12/1986 | Luxembourg |

*Primary Examiner*—Adrienne C. Johnstone
*Attorney, Agent, or Firm*—David E. Wheeler

[57] ABSTRACT

The turn-up portion of the carcass ply (12) in the bead portion of a pneumatic tire is interposed between the bead core (11) and a toe guard (18), and extends a substantial distance toward the maximum section width of the tire. The bead core (11) has a radial cross section which is substantially pentagonal. The toe guard (18) comprises a rubber material, a flexible textile material or a heat shrinkable material that protects the toe portion of the tire. Elastomeric stiffening member or chafer (20) may be disposed on each side of the carcass ply (12) in the bead portions and lower sidewalls of the tire. The assembly of a tire according to the invention mounted upon a specified rim (22) is also disclosed.

4 Claims, 2 Drawing Sheets

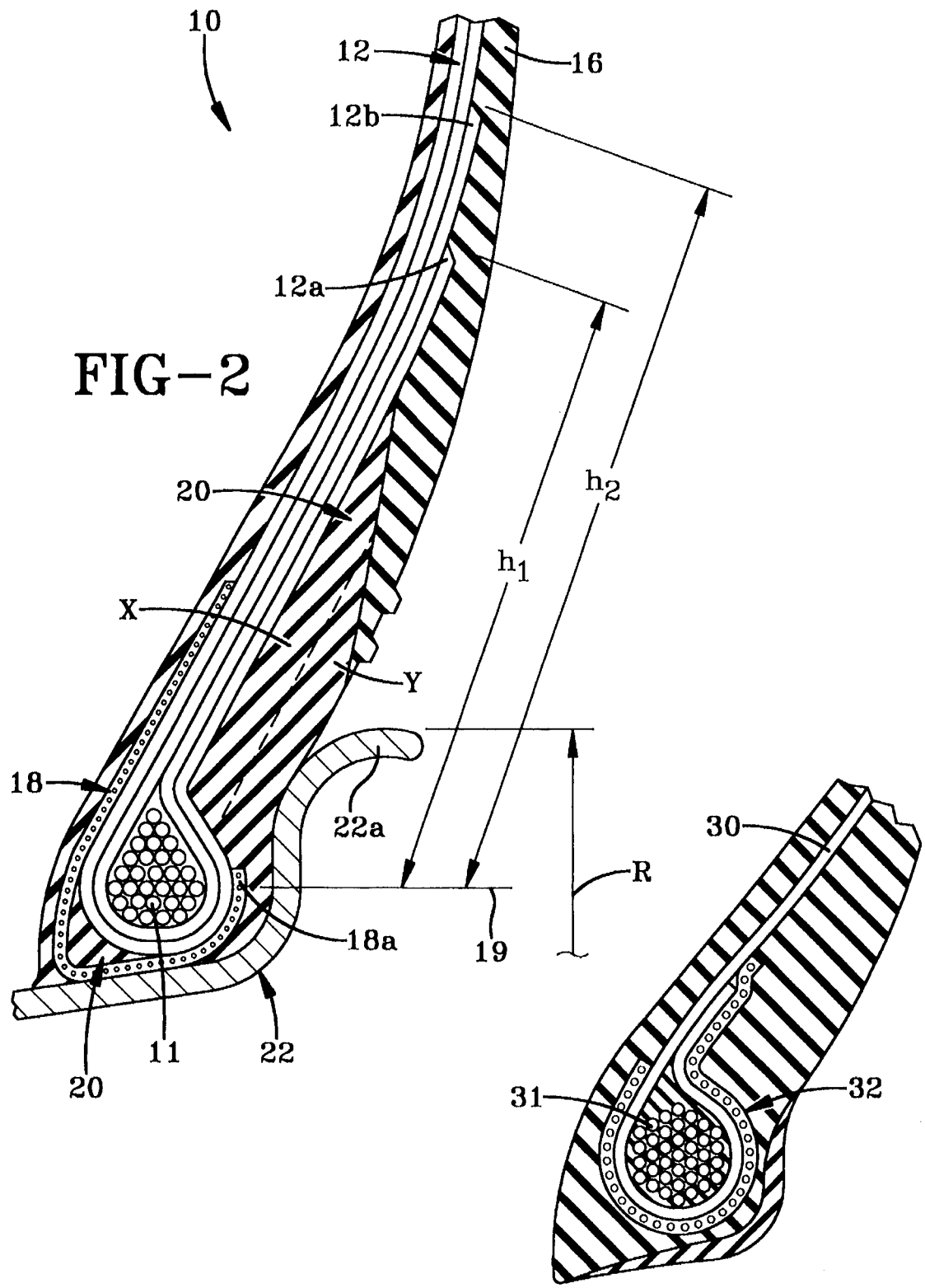

1

PNEUMATIC TIRE HAVING A HIGH ENDING, TURNUP LOCKED BEAD CONSTRUCTION

This is a CIP of U.S. application Ser. No. 08/084,371, filed Jun. 29, 1993 now abandoned.

BACKGROUND

The present invention relates to the bead portion of a pneumatic tire, and more specifically to a tire having a bead portion which has a pentagonal shape, no apex, a high turn-up and a locked-in structure when mounted on a specified rim.

The present invention is an improvement on U.S. Pat. No. 5,058,649 issued Oct. 22, 1991.

The desirability of having the turn-up portions of the carcass ply (or plies) of a pneumatic tire extend radially outwardly of the bead core the shortest possible distance is the premise on which prior art locked beads were developed. The proposed advantages included improved bead durability, and reduced material costs.

Referring to FIG. 3 there is shown a bead portion of a prior art tire as taught in commonly owned U.S. Pat. No. 4,922,985, issued May 8, 1990. The carcass ply 30 has a main portion that extends between both bead cores (not shown) of the tire and turn-up portions that are anchored around each bead core 31.

The "main portion of the carcass ply" is understood to mean the portion of the carcass ply which extends between the bead cores. It is understood that as used herein and in the claims a carcass ply comprises reinforcing cords embedded in an elastomeric substance and that these components are considered to be a single entity. Tires according to this prior art embodiment and U.S. Pat. No. 5,058,649 have the radially outer edges of the turn-up portions of the carcass ply disposed radially outwardly of the bead cores a minimal distance and are in contact with the main portion of the carcass ply. Suitable elastomeric materials surround the bead core, carcass ply, and other elastomeric components to complete the bead portion of the tire.

As used herein, the terms "radial" and "radially" refer to directions going towards or away from the axis of rotation of a tire. The terms "axial" and "axially" indicate directions that are parallel to the axis of rotation of a tire.

In tires according to this prior art embodiment and U.S. Pat. No. 5,058,649, a turn-up portion of the carcass ply 30 extends radially outwardly of the bead core 31 a minimal distance to allow for some pull-down of the carcass ply during the shaping and curing process. For example, in a passenger tire the edge of the turn-up portion may be located about 10 mm radially outwardly of the bead core.

In the prior art embodiment illustrated in FIG. 3, as well as in a tire and tire and wheel assembly according to U.S. Pat. No. 5,058,649, a clamping member 32 comprised a strip of side-by-side cords of a heat shrinkable material embedded in a suitable elastomeric substance having a permanent thermal shrinkage of at least 2%. This strip of cords extended circumferentially in contact with a radially innermost carcass ply 30 from a location radially and axially inward of the bead core 31 to a location radially outward of the bead core and adjacent to the main portion of the carcass ply, and there was no filler strip or apex disposed between the main portion and turn-up portion of the carcass ply. As used herein, a "cord" is understood to be either a single filament or a plurality of filaments twisted together with one another to form a cable.

The use of a single component for dual purposes as either a toe guard/clamping member or chafer/clamping member was believed to provide economical use of materials, labor, and machine time.

Other components that were located in the bead portion of some prior art tires included a toe guard and a chafer strip. Conventionally, a "toe guard" is a layer of reinforcing cords folded around the carcass ply and bead core on the side of the carcass ply furthest away from the bead core. The primary purpose of a toe guard is to protect the bead from damage during mounting of the tire on a rim and subsequent use of the tire on a vehicle. A chafer may be either a tough elastomeric material that protects the bead portion from abrasion during mounting and use of the tire, or a layer of fabric extending from radially inwardly of the bead core to the same radial height as the edge of the turn-up.

As used herein, "permanent thermal shrinkage" is understood to mean the intrinsic dimensional stability of a material when it is exposed to an elevated temperature as indicated by the percentage of permanent shrinkage. Generally, in the test procedure for shrinkage, a cord is exposed to a temperature of 177° C., and its percentage of shrinkage is measured directly from a calibrated dial in a shrinkage meter, which determines the total shrinkage inherent in the material. Other tests for shrinkage are known to those skilled in the art.

Tires according to the prior art embodiment of FIG. 3 were manufactured using a clamping member in which the heat shrinkable material was 1260/2 Nylon 6,6, having a permanent thermal shrinkage of about 4%. A polyester or other heat shrinkable material having a permanent thermal shrinkage of at least 2% could also be employed in the practice of the prior art inventions. It is continually the goal in the art to simplify the construction and reduce the expense of building tires, yet improve the durability, handling, rolling resistance and other properties of tires.

Other objects of the invention will be apparent from the following description and claims.

SUMMARY OF THE INVENTION

There is provided, in accordance with the invention, a pneumatic tire having a pair of axially spaced apart annular bead cores, and a carcass ply which is folded about each bead core. Each bead core comprises plurality of wraps of a single metallic filament, and has a radial cross-sectional shape which is substantially pentagonal with the greatest axial width of the bead core being located radially outwardly of the radially innermost edge of the bead core. The radially outermost extent of the bead core is a vertex of two of the sides of the pentagon. The carcass ply has a main portion that extends between the bead cores, and turn-up portions that are folded around the bead cores. A radially outer edge of each turn-up portion is in contact with the main portion of the carcass ply and extends 1.5 inches to 3.5 inches radially outward of the bead core, as measured along the sidewall of the tire from the mold ring line on the tire. In an illustrated embodiment, each end of a toe guard is disposed directly adjacent to the carcass ply. One end on the axially inner side of the bead core extends from a radially outermost location about one inch radially outward of the bead core on the axially inner side of the bead core to substantially the middle of the bead core. The other end of the toe guard is adjacent to the carcass ply at a location axially outward of the bead core and radially coinciding substantially with the widest cross section width of the bead core. The respective turn-up portion of the carcass ply is directly adjacent to both the toe guard and the bead core.

The toe guard is selected from the group consisting of a rubber strip, a strip of flexible textile material, and a strip of side by side cords of non-metallic heat shrinkable material which has a permanent thermal shrinkage of at least 2%.

An assembly comprising a pneumatic tire of the invention mounted upon a rim specified for use with the tire in the "YEAR BOOK OF THE TIRE AND RIM ASSOCIATION INC." for the year in which the tire is manufactured, is also provided. The rim has flanges which interact with the tire to assist the bead locking arrangement.

BRIEF DESCRIPTION OF THE DRAWINGS

FIG. 2 is a fragmentary cross-sectional view of the bead portion of a tire according to the present invention mounted upon a rim; and FIG. 3 is a cross-sectional view of the bead portion of a tire according to the prior art.

DETAILED DESCRIPTION OF THE INVENTION

Figure 1:
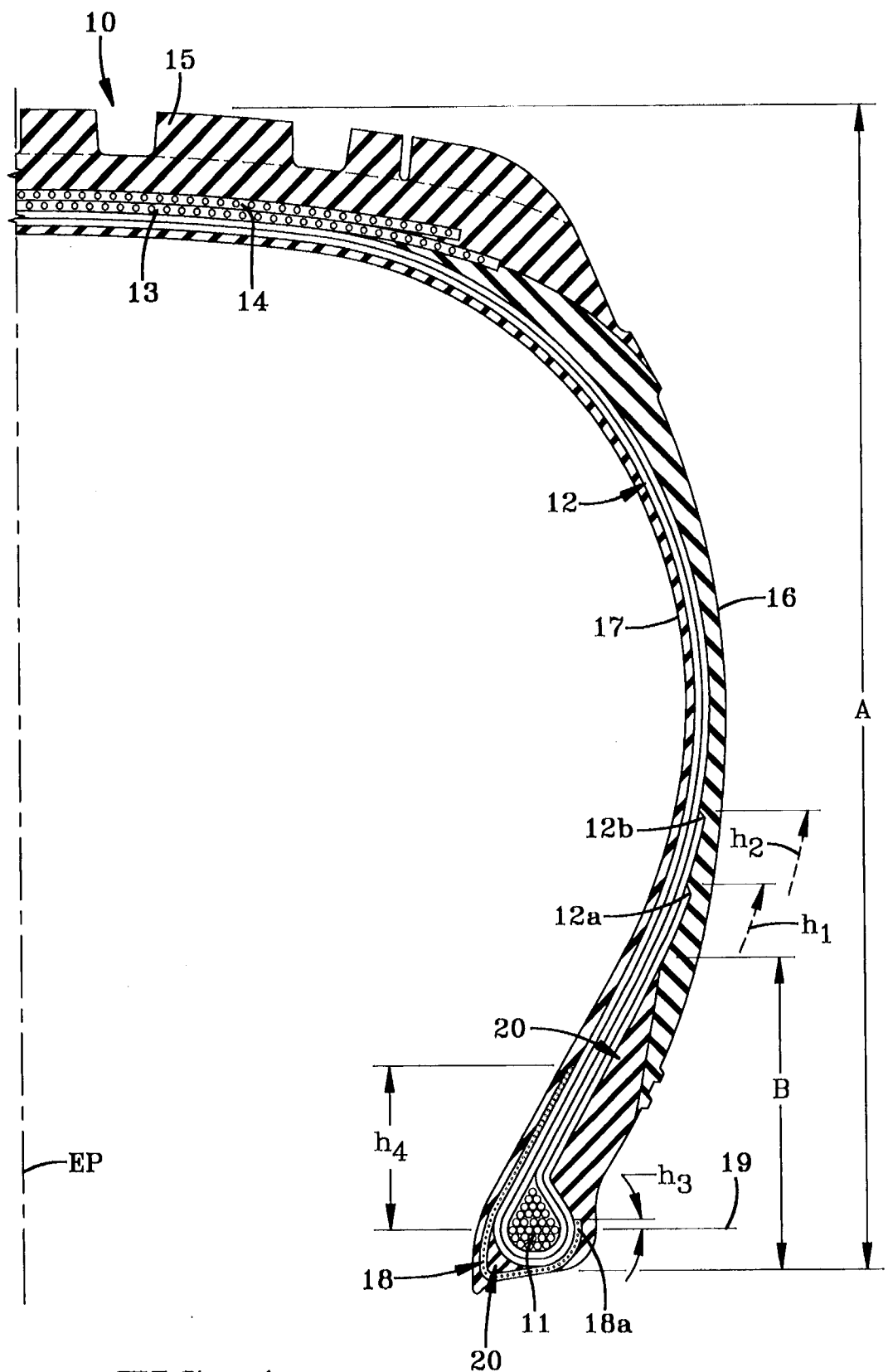
FIG. 1 is a partial cross-sectional view of a tire according to the present invention.

Referring now to FIGS. 1 and 2 there is shown a fragmentary cross-sectional view of a tire 10 according to the present invention and an enlarged fragmentary view of a bead portion and lower sidewall mounted upon a rim. A tire 10 according to the present invention is similar to the prior art tire which has already been described herein, the main differences being the elimination of the clamping member and the increase in the height of the turn-up of the carcass ply(s).

A tire according to the present invention has a pair of axially spaced apart bead cores 11 which each comprise a plurality of wraps of a single metallic filament. Each of the bead cores has a radial cross-sectional shape which is substantially pentagonal with the greatest axial width of the bead core being located radially outwardly of the radially innermost edge of the bead core. As used herein a "radial cross section" is a cross section taken in a plane which contains the axis of rotation of a tire or tire and rim assembly. As used herein, "substantially pentagonal" is understood to mean a five sided cross section, even though some or all of the sides may be curvilinear rather than rectilinear, as in a regular pentagon. The radially outermost extent of the bead core being a vertex of two of the sides of the pentagon.

A carcass ply 12 and a toe guard 18 are folded about each bead core 11 in the same manner as in prior art tires. In the tires of the invention, however, it has been found that a suitable locked in bead arrangement, where no apex or filler is used, can be achieved without using a clamping member. The locking in of the bead is achieved by the adhesion between the high turn-up and the main portion of the carcass ply, and the restriction of the flange of rim 22 when the tire is mounted on the rim and inflated. As can be seen in FIG. 2 in particular, the entire bead construction is below the top of the flange, and the pentagonal shape of the bead complements the natural pressures between the tire and the rim in holding the bead on the rim when the tire is inflated. (Note that pressure at the top of the bead, exerted by the flange, would have a downward vector in the bead core.) This is particularly true when tires employing high inflation, e.g. 50 psi, use the bead construction of the invention. Also, because the axially outer end of the toe guard 18 is clamped below the top of the rim flange 22a, chances that the toe guard would suffer a ply end separation are substantially reduced. The high turn-up, and the consequent high area of adhesive contact between the turn-up and the main carcass ply, further stabilizes the bead.

The carcass ply 12 and toe guard 18 are encased in suitable elastomeric compounds. The cables of the carcass ply 12 are oriented such that the tire according to the invention is what is commonly referred to in the art as a radial ply tire. It is believed to be an important feature of the invention that the turnup portions of the carcass plies are wholly disposed radially outwardly, and the axially outer portion of each toe guard are disposed radially inward of the specified outermost radius R of a rim 22 which is specified for use with the tire in the *YEAR BOOK OF THE TIRE AND RIM ASSOCIATION, INC.* for the year in which the tire is manufactured, or in the yearbook of The European Tyre & Rim Technical Organization for the year in which the tire is manufactured. The Tire and Rim Association, Inc. is headquartered at 3200 West Market Street, Akron 44313, U. S. A., and the "YEARBOOK" contains standards approved by the association for tire designations, dimensions, rim contours and dimensions, and other data and notes necessary for tire/rim exchangeability. The advantage of this particular arrangement of the bead core, carcass ply and toe guard is believed to be desirable because of the good bead durability obtained, despite a reduction in the volume and weight of the structure.

A belt structure comprising a plurality of belt plies 13, 14 is located radially outwardly of the carcass ply 12 in a crown portion of the tire. An elastomeric tread portion 15 is disposed radially outwardly of the belt structure.

The metallic filament used in the bead cores of the illustrated embodiment is 0.050 inch diameter high tensile steel wire coated with bronze to enhance its bonding with rubber. Of course, depending upon the tire size, other filament diameters could be used in practicing the invention.

Each of the bead cores 11 has a radial cross-sectional shape which is substantially pentagonal. For example, in a pick up truck tire of size LT 235/85R16, each of the bead cores may be fabricated having eight radially superposed layers of wraps of said single metallic filament. The number of wraps in each layer, beginning with the radially innermost layer being 4,5,6,5,4,3,2,1. For other sizes of tires, different numbers of layers, and wraps in each layer may be used.

The carcass ply and toe guard are encased in suitable elastomeric compounds. It may be desirable to interpose thin layer of a tough abrasion resistant rubber, which does not extend radially outwardly beyond the bead core, between the carcass ply and the pentagonal bead core. This layer of a tough abrasion resistant rubber is intended to prevent chafing of the cords of the carcass ply against any sharp edge of the bead core. A tire according to the invention may have either a single carcass ply of aramid cords, as illustrated in FIG. 3, or it may have a plurality of carcass plies of polyester cords. Of course, the combination of the number of carcass plies and cord material is dependent upon the operating parameters for a given tire. A tire according to the illustrated embodiment has a toe guard comprising 1260/3 Nylon 6,6 cords spaced at nineteen cords per inch and oriented at 45° with respect to a plane which is parallel to the equatorial plane EP of the tire. The equatorial plane is a plane midway between the tire sidewalls and perpendicular to the axis of rotation of the tire.

The carcass ply turn up(s) is/are turned up around pentagonal shaped bead bundle 11 and locked against the main portion of the carcass ply 12 by the sidewall 16. In the illustrated embodiment, two carcass ply turn-ups with high ends (12a, 12b), are two and three inches (h1, h2), respectively, radially outward of the mold ring split location 19 as measured along the sidewall. It is believed that satisfactory results will be obtained using carcass ply turn-ups of about 1.5 to 3.5 inches above mold ring split location 19.

The mold split ring location is the point on the tire where the bottom of the mold and the top of the mold come together when the tire is placed in the mold. In the specific illustrated embodiment (see FIG. 1), the axially outer end 18a of toe guard 18 is about 0.2 inch (h3) above the mold split ring 19 (on a 16.32 inch diameter mold) and an end on the axially inner side of the bead core extends from a radially outermost location about one inch (h4) radially outward of the bead core from substantially the middle of the bead core.

An axially outer elastomeric stiffening member 20 comprising an elastomeric compound having a Shore D hardness of 30 or greater and a Young's Modulus of 3,400 pounds per square inch (p.s.i.) or greater is located axially outwardly of the carcass ply and toe guard and extends from a radially inner end located radially inwardly of the radially outermost extent of the bead core 11, to a radially outer end which is disposed radially outwardly of the flange of rim 22. For example, in a tire of size LT 235/85R16, having a maximum section height A of about 7.8 inches, the axially outer stiffening member extends radially outwardly a distance B of about 2.5 inches from the Sharp Diameter of the tire.

In an alternative embodiment, chafer 20 may comprise coextruded compounds X and Y which have different properties. The properties can be engineered to provide extra stiffness to the inner portion Y of the chafer, to stiffen the lower sidewall of the tire (to provide better handling). A less stiff compound in the outer portion X of the chafer cushions the carcass ply and the turn-up from forces encountered by the outside of the tire and minimizes rim chafing.

It has been found that the present bead construction is very stable and can demonstrate high stability using ply coat compounds and chafer (stiffening) compounds having a broad range of properties. Suitable properties for ply coat compounds and stiffening piece compound fall in the following ranges.

|  | MODULUS (MPa) | ELONGATION | SHORE 'D' |
|---|---|---|---|
| PLYCOAT | 7.0–12.0 | 450%–750% |  |
| STIFFENING PIECE | 9.0–15.0 | 120%–300% | 30–45 |

The axially outer stiffening member 20 aids in moving stress concentrations away from the edge of the carcass ply 12, which is expected to aid in reducing failures due to separations of the tire components. A layer of sidewall rubber 16 is disposed axially outwardly of the carcass ply in the sidewall portion of the tire in the usual manner.

Using the present construction, it has been found that the tire of the invention can be made without using apexes or fillers, clamping members and chippers in the bead area of the tire. This construction is lighter in weight than prior art constructions, which provides operating efficiencies. Production efficiencies are also realized. It has been found that the construction of the instant invention shows improved bead durability.

The invention is further illustrated with reference to the following example.

EXAMPLE

Tests were made comparing the durability of the bead construction of the present invention with the bead construction of U.S. Pat. No. 5,058,649 and with conventional hexagonal shaped bead constructions. All tires tested were size LT235/85R16 HT, and all were made the same, except as delineated in the following table. The "A" and "B" constructions were made according to the '649 patent, and the "G" and "H" constructions were made in accordance with the present invention. The control was a conventional tire with a hexagonal bead.

Apex 1 comprises the rubber closest to the bead and between the main portion of the carcass ply and the turn-up, and apex 2 is the upper half of such rubber when the apex is duplexed. Apex 3 is rubber outside the turn-up (i.e. on the rim side of the tire), and apex 4 is rubber between the main portion of the carcass ply and the inner liner.

| BEAD IMPROVEMENT LT235/85R16 HT LOCKED TIE-IN | | | | | | |
|---|---|---|---|---|---|---|
| Construction | A | B | G | H | H | A CONTROL |
| PLY FABRIC | S.M. | S.M. | H.M. | H.M. | H.M. | S.M. |
| COMPD | 1 | 2 | 3 | 4 | 4 | 3 |
| GAUGE | .052 | .056 | .059 | .062 | .059 | .059 |
| BEAD | PENT | PENT | PENT | PENT | PENT | HEX |
| GUM FLIPPER | NONE | YES | YES | NONE | NONE | NONE |
| APEX 1 COMPD | YES | YES | NONE | NONE | NONE | YES |
| APEX 3 COMPD | NONE | NONE | NONE | NONE | NONE | YES |
| APEX 4 COMPD | YES | YES | NONE | NONE | NONE | NONE |
| BEAD OUT (mi) | 4,883 | 2,336 | 6,063 | 8,632 | 5,768 | 5,138 |
|  | 7,125 | 7,200 | 6,475 | 8,687 | 6,619 | 6,037 |
|  |  |  |  | 6,402 |  |  |
| FAT CAP |  |  |  |  |  |  |
| INDEX | 1.865 | 1.480 | 1.98 |  | 2.04 | 1.94 |
| 90% LIMIT ATE (mi) | +/− 240 | +/− 1006 | +/− 1187 |  | +/− 1062 | +/− 376 |
| rt front |  |  |  |  | 45,000 SF | 30,000 SF |
| lt front |  |  |  |  | 45,000 SF | 30,000 SF |
| rt rear |  |  |  |  | 45,000 SF | 30,000 F |
| lt rear |  |  |  |  | 45,000 SF | 30,000 F |

The ply fabric in each tire tested comprised 1300d/3 cables (3900 denier total) polyester at 27 epi. S.M. refers to standard modulus, and H.M. refers to high modulus cables. (The high modulus cables are the same as standard modulus cables except that the H.M. cables were heated and stretched.)

The ply coat compounds used in each construction had the following properties.

|   | Modulus ±2 (MPa) | Tensile ±3 (MPa) | Elongation % ±80 |
|---|---|---|---|
| 1. | 13 | 16 | 350 |
| 2. | 9 | 21 | 580 |
| 3. | 7 | 21 | 600 |
| 4. | 9 | 15 | 420 |

The Fat Cap index is a step load test where, at one end of the scale, the load is increased 7% every 100 miles, and at the other end of the scale, the load is increased 7% every 800 miles. The load at failure for each test of each tire construction is plotted, and the slope of the line is the index. In this test, higher numbers indicate better results.

The Bead-Out test is a severe condition test where the tire is inflated to 80% of its rated inflation, and a load comprising 200% of the rated load for test inflation is applied. The results of the test are defined by the number of miles a tire runs under the defined conditions. The results demonstrate more repeatable results for the G and H constructions as compared to the A and B constructions and the control, and an improvement in durability of the G and H constructions over the control.

The ATE test (actual vehicle testing at 110% load) shows improved results for the one H construction tested.

While certain representative embodiments and details have been shown for the purpose of illustrating the invention, it will be apparent to those skilled in the art that various changes and modifications may be made therein without deviating from the spirit or scope of the invention.

What is claimed is:

1. A pneumatic tire comprising:
   (a) a pair of axially spaced apart annular bead cores, each bead core comprising a plurality of wraps of a single metallic filament, each bead core having a radial cross-sectional shape which is substantially pentagonal with the greatest axial width of the bead core being located radially outwardly of the radially innermost edge of the bead core, and with the radially outermost extent of the bead core being the vertex of two of the sides of said pentagon;
   (b) a carcass ply which is folded about each said bead core, said carcass ply having a main portion that extends between the bead cores and turn-up portions that are folded around the bead cores, a radially outer edge of each said turn-up portion being in contact with said main portion and extending 1.5 inches to 3.5 inches radially outward of said bead cores as measured along a sidewall of the tire from a mold ring line on the tire, and no bead apex or filler is present between the carcass turn-up and the main portion of the carcass ply, and
   (c) a toe guard associated with each bead and having each end thereof disposed directly adjacent to said carcass ply, an end on the axially inner side of the bead core extends from a radially outermost location about one inch radially outward of the bead core to substantially the middle of the bead core, and the other end of the toe guard is adjacent to the carcass ply at a location axially outward of the bead core and radially coinciding substantially with the widest cross section width of the bead core, and wherein the respective turn-up portion of the carcass ply is directly adjacent to both the toe guard and the bead core.

2. The pneumatic tire of claim 1 wherein said toe guard is selected from the group consisting of a rubber strip, and a strip of side by side cords of non-metallic heat shrinkable material which has permanent thermal shrinkage of at least 2%.

3. An assembly comprising a pneumatic tire mounted upon a rim specified for use with the tire in the YEAR BOOK OF THE TIRE AND RIM ASSOCIATION INC. for the year in which the tire is manufactured, said rim having rim flanges and said tire comprising:
   (a) a pair of axially spaced apart annular bead cores, each bead core comprising a plurality of wraps of a single metallic filament, each bead core having a radial cross-sectional shape which is substantially pentagonal with the greatest axial width of the bead core being located radially outwardly of the radially innermost edge of the bead cores, and with the radially outermost extent of the bead core being the vertex of two of the sides of said pentagon;
   (b) a carcass ply which is folded about each said bead core, said carcass ply having a main portion that extends between the bead cores and turn-up portions that are folded around the bead cores, a radially outer edge of each said turn-up portion being in contact with said main portion and extending 1.5 inches to 3.5 inches radially outward of said bead cores as measured along a sidewall of the tire from a mold ring line on the tire, and no bead apex or filler is present between the carcass turn-up and the main portion of the carcass ply, and
   (c) a toe guard associated with each bead and having each end thereof disposed directly adjacent to said carcass ply, an end on the axially inner side of the bead core extends from a radially outermost location about one inch radially outward of the bead core to substantially the middle of the bead core, and the other end of the toe guard is adjacent to the carcass ply at a location axially outward of the bead core and radially coinciding substantially with the widest cross section width of the bead core, and wherein the respective turn-up portion of the carcass ply is directly adjacent to both the toe guard and the bead core.

4. The assembly of claim 3 wherein said toe guard is selected from the group consisting of a rubber strip, and a strip of side by side cords of non-metallic heat shrinkable material which has permanent thermal shrinkage of at least 2%.

* * * * *